(12) United States Patent
Koyanaka et al.

(10) Patent No.: US 11,077,467 B2
(45) Date of Patent: Aug. 3, 2021

(54) LIBS-TYPE OBJECT SORTING DEVICE

(71) Applicant: National Institute of Advanced Industrial Science and Technology, Tokyo (JP)

(72) Inventors: Shigeki Koyanaka, Tsukuba (JP); Kenichirou Kobayashi, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 224 days.

(21) Appl. No.: 16/316,879

(22) PCT Filed: Jul. 4, 2017

(86) PCT No.: PCT/JP2017/024444
§ 371 (c)(1),
(2) Date: Jan. 10, 2019

(87) PCT Pub. No.: WO2018/012346
PCT Pub. Date: Jan. 18, 2018

(65) Prior Publication Data
US 2019/0291141 A1 Sep. 26, 2019

(30) Foreign Application Priority Data
Jul. 15, 2016 (JP) .............................. JP2016-140913

(51) Int. Cl.
*B07C 5/10* (2006.01)
*B07C 5/342* (2006.01)
(Continued)

(52) U.S. Cl.
CPC ................ *B07C 5/342* (2013.01); *B07C 5/10* (2013.01); *B07C 5/34* (2013.01); *G01B 11/24* (2013.01); *G01N 21/71* (2013.01); *G01N 21/718* (2013.01)

(58) Field of Classification Search
CPC .. B07C 5/342; B07C 5/34; B07C 5/10; G01B 11/24; G01N 21/71; G01N 21/718
See application file for complete search history.

(56) References Cited

U.S. PATENT DOCUMENTS 9,785,851 B1 * 10/2017 Torek ...................... B07C 5/368
9,855,588 B2 * 1/2018 Gauthier ............... B07C 5/3427
(Continued)

FOREIGN PATENT DOCUMENTS

CN 102221345 A 10/2011
EP 2782686 A1 10/2014
(Continued)

OTHER PUBLICATIONS

Werheit et al., "Fast single piece identification with a 3D scanning LIBS for aluminium cast and wrought alloys ecycling"; Journal of Analytical Atomic Spectrometry, 2011, vol. 26, pp. 2166-2174 (11 pages).*
(Continued)

*Primary Examiner* — Patrick H Mackey
(74) *Attorney, Agent, or Firm* — Osha Bergman Watanabe & Burton LLP

(57) ABSTRACT

An LIBS-type object sorting device includes a three-dimensional-shape measurement means that acquires a space-coordinate group of a top face of an object to be sorted in top view on a conveyor, an LIBS analyzing means that performs chemical composition analysis on the object to be sorted while irradiating the object to be sorted with laser light, and a conveying-path switching means that switches a conveying path of the object to be sorted, in this order. The device includes a computing means that determines an analyzing section on which the LIBS analysis is to be performed, and a control means that causes a beam position to move and causes, when detecting that the analyzing section has reached from a movement amount of the conveyor, based on
(Continued)

the movement amount, a beam-focus position to move along the analyzing section while irradiating the laser light.

10 Claims, 13 Drawing Sheets

(51) Int. Cl.
*G01N 21/71* (2006.01)
*G01B 11/24* (2006.01)
*B07C 5/34* (2006.01)

(56) References Cited

U.S. PATENT DOCUMENTS

| | | | |
|---|---|---|---|
| 10,478,861 B2* | 11/2019 | Comtois | G01N 21/63 |
| 10,486,209 B2* | 11/2019 | Wimmer | B07C 5/34 |
| 10,641,712 B2* | 5/2020 | Buchter | B07C 5/3427 |
| 2003/0034281 A1 | 2/2003 | Kumar | |
| 2003/0132142 A1 | 7/2003 | Kumar | |
| 2010/0290032 A1* | 11/2010 | Bugge | B07C 5/342 |
| | | | 356/51 |
| 2014/0231314 A1 | 8/2014 | Pillkahn | |
| 2018/0161767 A1* | 6/2018 | Gauthier | B07C 5/366 |
| 2018/0275068 A1* | 9/2018 | Ozcan | G01N 21/85 |

FOREIGN PATENT DOCUMENTS

| | | |
|---|---|---|
| JP | 2000-356512 A | 12/2000 |
| JP | 2010-172799 A | 8/2010 |
| JP | 2011-185608 A | 9/2011 |
| JP | 2014-529679 A | 11/2014 |
| JP | 2014-533604 A | 12/2014 |
| JP | 2016-118475 A | 6/2016 |
| WO | 2013/076308 A1 | 5/2013 |

OTHER PUBLICATIONS

Werheit et al., "Fast single piece identification with a 3D scanning LIBS for aluminum cast and wrought alloys recycling"; Journal of Analytical Atomic Spectrometry, 2011, vol. 26, pp. 2166-2174 (11 pages) (Year: 2011).*
International Search Report issued in International Application No. PCT/JP2017/024444, dated Sep. 26, 2017 (2 pages).
Written Opinion issued in International Application No. PCT/JP2017/024444, dated Sep. 26, 2017 (5 pages).
P. Werheit et al., "Fast single piece identification with a 3D scanning LIBS for aluminium cast and wrought alloys recycling"; Journal of Analytical Atomic Spectrometry, 2011, vol. 26, pp. 2166-2174 (11 pages).
International Preliminary Report on Patentability issued in International Application No. PCT/JP2017/024444; dated Jan. 24, 2019 (9 pages).

* cited by examiner

LIBS-TYPE OBJECT SORTING DEVICE

TECHNICAL FIELD

The present invention relates to an LIBS-type object sorting device that sorts an object with LIBS analysis, and particularly relates to an LIBS-type object sorting device that performs LIES analysis on an object to be sorted while conveying the object to be sorted with a conveyor and sorts the object to be sorted on the basis of the LIBS analysis.

BACKGROUND ART

Laser induced breakdown spectroscopy (LIBS) is a qualitative and quantitative analysis method of an element contained in an object to be measured. Specifically, condensing irradiation of a fine spot on the surface of an object with pulse laser light, instantaneously separates atoms into ions and electrons, to make a plasma state. Then, spectroscopic analysis is performed on light having an atomic intrinsic wavelength, emitted when the atoms in the excited state return to the ground state. Typically in the LIBS analysis, after the surface of an object to be measured is smoothed by, for example, polishing, the object to be measured is secured such that the focal point of the pulse laser light is accurately positioned on the polished face, and then measurement is performed.

In recent years, development of an object soring device with the LIBS analysis LIES-type object sorting device) has advanced. This is an individual sorting device that detects, while supplying objects to be sorted at high speed with a conveyor belt (a maximum moving speed of 5 m/s), element information contained in each individual object to be sorted, in a contactless manner with the LIBS analysis, identifies the classifications thereof, and sorts the objects to be sorted into separate containers on the basis of the classifications. The rear end of the conveyor is provided with a sorting machine, such as an electromagnetic paddle or an air jet. The device is used as a means that sorts, on the basis of the kinds of alloys, scraps of metal, such as iron or aluminum, generated in a crushing and sorting disposal facility for disused vehicles or disused home electronics. For example, Patent Literature 1 discloses such an LIBS-type object sorting device.

In the LIBS analysis, if condensing irradiation of an irradiation spot (approximately, a diameter of 0.1 to 1 mm) with the pulse laser light, cannot be performed sufficiently, no plasma emission occurs and thus no analysis can be performed. That is for an object to be sorted having an intricate shape similar to amorphous scraps of metal generated in crushing disposal of, for example, disused vehicles or disused home electronics, it is necessary to detect spatial information (three-dimensional information), such as the position or height of the object to be sorted, with high accuracy and to determine the position of an optimum irradiation spot for the pulse laser light on the basis of the spatial information. Then, it is necessary to apply condensing irradiation to the position accurately without overshooting. For the LIBS-type object sorting device, it is necessary that account is taken of movement of an object to be sorted due to the conveyor belt.

As a detecting means of three-dimensional information regarding a moving object, for example, there is a known method of measuring, with a laser range finder that is disposed above a conveyor and faces vertically downward, light propagation time to the surface of an object and measuring the contour in the height direction of the object (cross section parallel to the moving direction). However, because an object that has passed through the measurement region of the laser range finder, is only measured, a plurality of objects to be sorted cannot be disposed alongside in the traveling direction of the conveyor, and thus there is a large limit on the number of objects to be processed per unit time.

Meanwhile, as another detecting means of three-dimensional information regarding a moving object, a "laser three-dimensional measurement method (light-section method)" has been known. An object moving on a conveyor is scanned with a laser projector (linear laser light source) and movement in the height direction of reflected light (emission line) varying in response to a surface shape, is captured at certain intervals, so that the surface shape is as three-dimensional coordinate data. This can calculate positional information regarding, for example, the center point of an object, can measure a plurality of objects in the scanning range, can measure a plurality of objects to be sorted even disposed alongside in the traveling direction of the conveyor, and thus has an advantage in terms of the number of objects to be processed per unit time.

CITATION LIST

Patent Literature

Patent Literature 2014-529679 A

SUMMARY OF INVENTION

Technical Problem

Here, there is an LIBS-type object sorting device that irradiates one spot or several spots of the object to be sorted with laser light dispersedly and then performs LIES analysis. Therefore, with control of a three-dimensional galvano-scanner, this device can irradiate the entire region of a conveyor width with the laser, to perform the LIES analysis. Meanwhile, for an object to be sorted similar to a crushed scrap having an intricate surface shape, selection of a flat spot and irradiation of the flat spot with the pulse laser light are necessary, otherwise the probability of plasma generation or an S/N ratio falls.

The present invention has been made in consideration of the situation described above, and an object of the present invention is to provide an LIBS-type object sorting device that performs LIBS analysis on an object to be sorted while conveying the object to be sorted with a conveyor and sorts the object to be sorted on the basis of the LIBS analysis.

Solution to Problem

In order to solve the problem, according to the present invention, provided is an LIBS-type object sorting device configured to perform LIBS analysis on an object to be sorted while conveying the object to be sorted with a conveyor, the LIBS-type object sorting device being configured to sort the object to be sorted, the LIBS-type object sorting device including, with a traveling direction, a width direction, and a height direction of the conveyor defined as X, Y, and Z, respectively: a three-dimensional-shape measurement means configured to repeatedly measure a cross-sectional shape of the object to be sorted at a cross-section-measurement YZ vertical face every predetermined time, the three-dimensional-shape measurement means being configured to acquire a space-coordinate group of a top face of the object to be sorted in top view on the conveyor with a reference origin on the object to be sorted as a reference; an LIB S analyzing means including a width-direction movement means configured to move a beam position of laser light in a Y direction in a laser-movement YZ vertical face and a height-direction movement means configured to move a beam-focus position of the laser light in a Z direction in the laser-movement YZ vertical face, the LIBS analyzing means being configured to perform chemical composition analysis on the object to be sorted while irradiating the object to be sorted with the laser light; a conveying-path switching means configured to switch a conveying path in the Z direction of the object to be sorted subjected to the chemical composition analysis, the three-dimensional-shape measurement means, the LIBS analyzing means, and the conveying-path switching means being provided in this order in the X direction; a computing means configured to acquire the space-coordinate group of the top face on an analysis XZ vertical face including an analyzing point selected from the space coordinates, the computing means being configured to determine an analyzing section on which the LIBS analysis is to be performed; and a control means configured to cause the width-direction movement means to move the beam position to the analysis XZ vertical face, the control means being configured to cause, when detecting that the analyzing section has reached the analysis XZ vertical face from a movement amount of the conveyor, based on the movement amount, the height-direction movement means to move the beam-focus position to the space coordinates along the analyzing section while causing the object to be sorted to be irradiated with the laser light.

According to the present invention, the object to be sorted that is being conveyed by the conveyor is subjected to the LIBS analysis, and the object can be sorted on the basis of the LIBS analysis. In particular, even in the case of use of an LIBS analyzing device having a scheme of repeatedly irradiating relatively weak laser light at high frequency, an object moving at high speed on the conveyor can be sorted with high accuracy (high S/N ratio) in the entire region in a belt-width direction.

In the invention, the three-dimensional-shape measurement means may acquire the space-coordinate group after detecting passage of the object to be sorted through the cross-section-measurement YZ vertical face, and additionally may acquire a reference movement amount of the conveyor until the reference origin reaches the laser-movement YZ vertical face, and the control means may cause the beam position d the beam-focus position to move, based on the reference movement amount. In this case, it is preferable that the reference origin is a position at which the object to be sorted first reaches the cross-section-measurement YZ vertical face.

A plurality of the objects to be sorted may have respective parts disposed alongside in the Y direction, and the computing means may determine the respective analyzing sections of the objects to be sorted such that the analyzing sections are not disposed alongside in the Y direction. In this case, it is preferable that provided is a conveyance detecting means located upstream of the three-dimensional-shape measurement means in the X direction, the conveyance detecting means being configured to detect conveyance of the objects to be sorted, the conveyance detecting means being configured to start an operation of the three-dimensional-shape measurement means, the conveyance detecting means being configured to include a photoelectric sensor.

According to the invention, even in a case where the plurality of objects to be sorted is conveyed simultaneously on the conveyor, the objects to be sorted can be sorted accurately.

In the invention, the three-dimensional-shape measurement means may include a three-dimensional image camera having a laser projector that projects a cross-sectional-shape line of the object to be sorted at the cross-section-measurement YZ vertical face. In this case, it is preferable that the space-coordinate group corresponds to a pixel of an image of the top face in top view on the conveyor.

The conveyor may have an incremental encoder that outputs a pulse signal in response to a rotational amount of a driving motor; the control means may cause the laser light to be irradiated along the analyzing section, with counter number corresponding to the pulse signal, associated with the pixel of the image; and the width-direction movement means and the height-direction movement means may control a mirror angle and a lens focal length in an optical system of the laser light.

According to the invention, because a conveyed distance from a detected position of the object to be sorted (cross-section-measurement YZ vertical face) can be grasped accurately and additionally the focus position of the laser light to be irradiated by the LIBS analyzing means can be controlled more precisely, object to be sorted can be sorted more reliably.

DESCRIPTION OF EMBODIMENTS

One embodiment of an LIBS-type object sorting device according to the present invention, will be described below with FIGS. 1 to 7.

Figure 1:
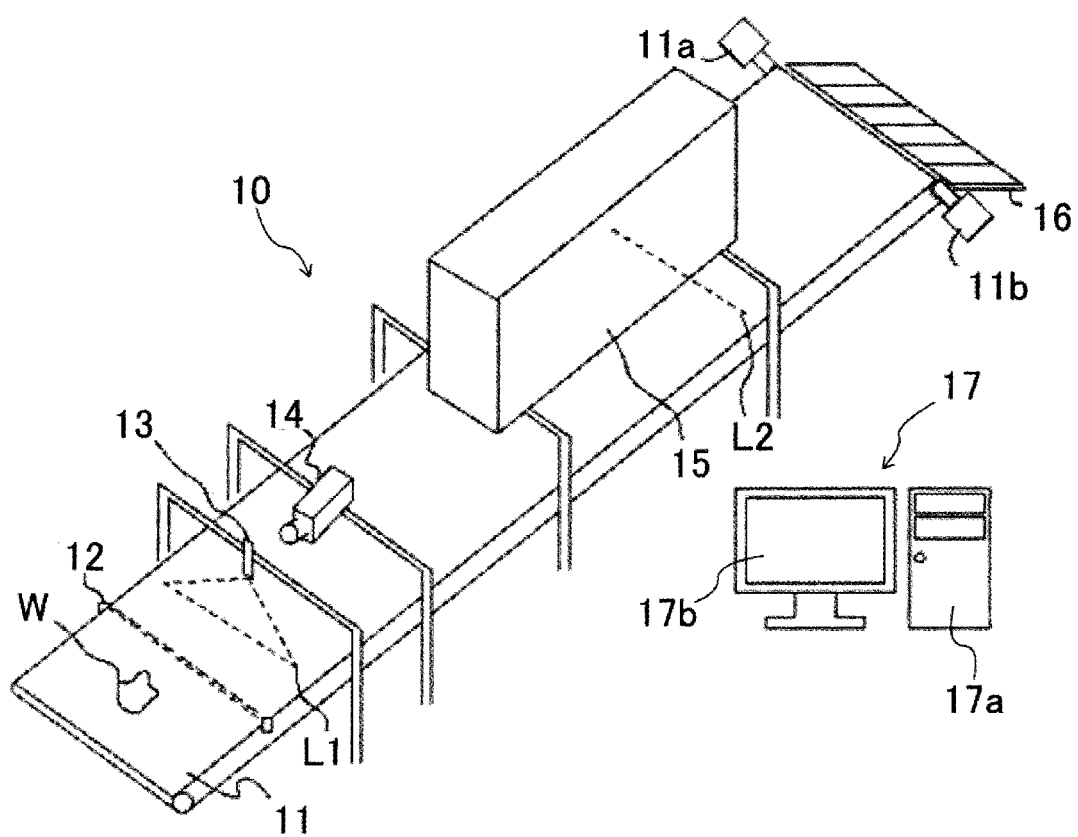
FIG. 1 is a perspective view illustrating a representative exemplary LIBS-type object sorting device according to the present invention.

As illustrated in FIG. 1, the LIBS-type object sorting device 10 includes: a conveyor 11 that conveys an object W that is an object to be sorted; a photoelectric sensor 12 disposed across the conveyor 11; a laser projector 13 that irradiates the conveyor 11 from above; a three-dimensional image camera 14 that captures the object W conveyed on the conveyor 11; an LIES analyzing device 15 disposed downstream of the three-dimensional image camera 14, the LIBS analyzing device 15 having a laser-irradiation mechanism; a paddle (switching mechanism) 16 disposed downstream of the LIBS analyzing device 15, the paddle 16 being to switch a conveying path; and a control device 17 that controls irradiation timing of the laser irradiation-mechanism and the focal length of a laser in the LIBS analyzing device 15, on the basis of image data captured by the three-dimensional image camera 14. Note that the conveyor 11 includes a conveyor driving motor 11a and an incremental encoder 11b that rotates coaxially with the conveyor driving motor 11a.

When the object W reaches the position of the photoelectric sensor 12, the three-dimensional image camera 14 starts up. Then, in accordance with the principle of the light-section method, the three-dimensional image camera 14 records, at certain time intervals, reflected light of a laser when the object passes through a projection line L1 projected by the laser projector 13 (line formed in a direction perpendicular to the conveying direction of the conveyor 11). Here, the path face of the laser that forms the projection line, is defined as a "cross-section-measurement YZ vertical face". The data recorded in the passage through the YZ vertical face, is transmitted as a three-dimensional image to the control device 17. Then, the position and the surface shape of the object W are analyzed with a dedicated program, and a voltage signal of controlling the focal position of the laser light is generated and then is transmitted to the LIES analyzing device 15.

When the object W reaches a laser-irradiation position L2 of the LIBS analyzing device 15, the LIBS analyzing device 15 irradiates the surface of the object W with the laser so as to generate plasma, and analyzes the spectrum of the emission wavelength of the plasma. On the basis of a result thereof, the paddle 16 provided on the downstream side of the conveyor 11 is operated so as to change the drop position of the object, so that sorting is performed.

Figure 2:
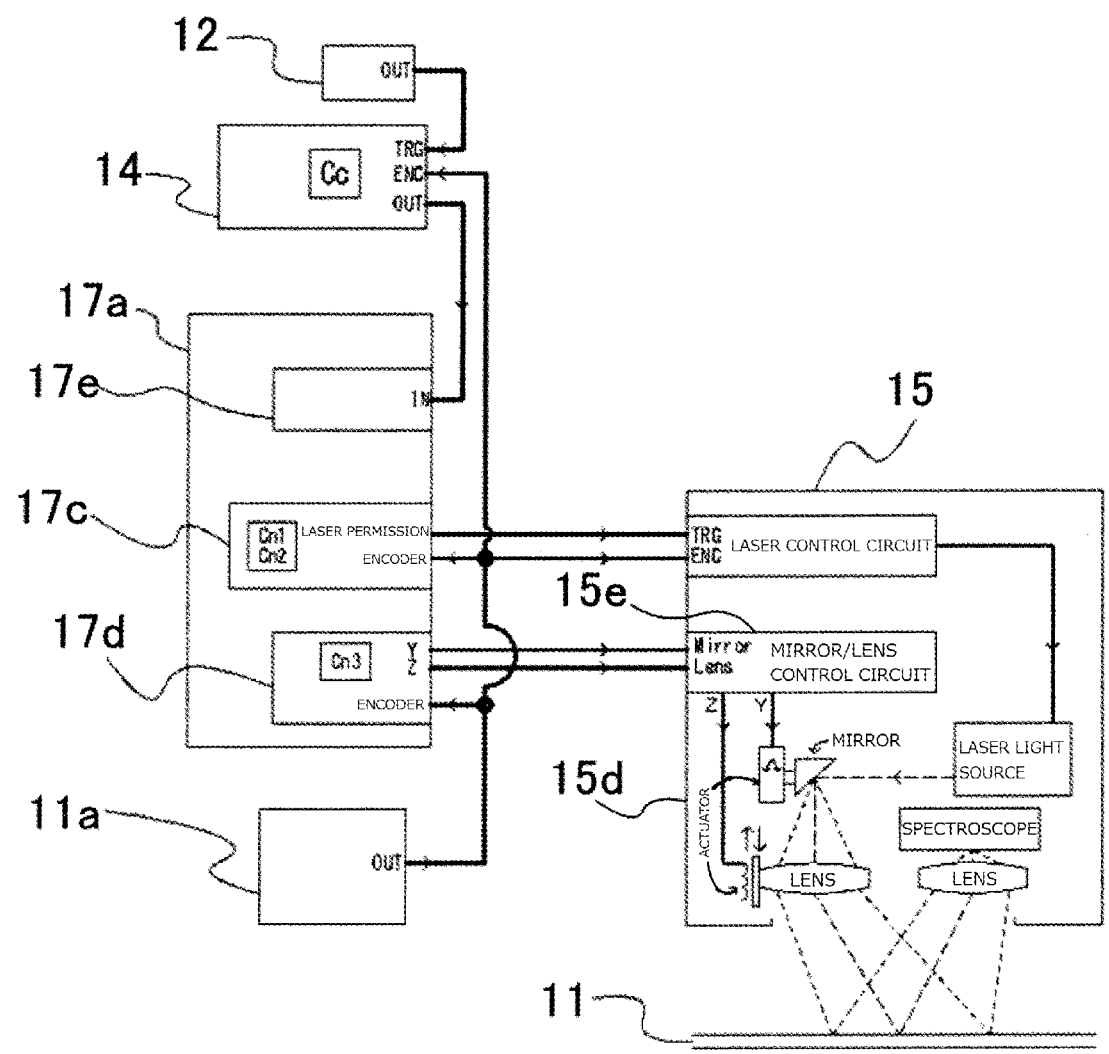
FIG. 2 is a diagram illustrating signal paths in the LIES-type object sorting device illustrated in FIG. 1.

FIG. 2 illustrates signal paths in the LIBS-type object sorting device 10. The control device 17 that is, for example, a personal computer, includes a main unit 17a, a monitor 17b, and a counter board 17c, a D/A converter board 17d, and a camera input board 17e that are built in the main unit 17a.

The LIBS analyzing device 15 has a laser light source 15h, a control circuit 15c thereof, an optical system 15d including a mirror and condensing lenses, a control circuit 15e thereof, built inside a casing 15a. On the basis of a command signal from the control device 17, the LIBS analyzing device 15 changes a mirror angle so as to control a laser condensing position in the belt-width direction (Y direction) on the conveyor 11, and changes the position of a condensing lens so as to control the condensing position in the height direction (Z direction) on the conveyor 11. The LIBS analyzing device 15 including a means that senses the plasma generated by the irradiation of the object W with the laser and acquires spectral data thereof (not illustrated), is connected to the control device 17 such that the acquired spectral data can be transmitted.

The photoelectric sensor 12 outputs a trigger signal for causing the three-dimensional image camera 14 to start capturing when the object W passes. The incremental encoder 11b outputs a pulse signal having one pulse at specific rotational angles. The pulse signal is transmitted to the three-dimensional image camera 14, the counter board 17c, the D/A converter board 17d, and the laser control circuit 15c in the LIBS analyzing device 15, so that each count value increments by one. In this case, because the counter in the three-dimensional image camera 14, the counters in the control device 17, and the counter in the laser control circuit 15c mutually have different initial values, the counter values thereof are in disagreement.

The three-dimensional image camera 14 having one counter Cc, receives the pulse signal from the incremental encoder 11b and additionally outputs the captured three-dimensional image to the camera input board 17e. The counter board 17c having two counters Cn1 and Cn2, receives the pulse signal from the incremental encoder 11b and additionally outputs a laser-output enabling signal to the laser control circuit 15c in the LIBS analyzing device 15. The D/A converter board 17d having one counter Cn3, receives the pulse signal from the incremental encoder 11b and additionally outputs the signal of controlling the condensing position in the Y direction and the Z direction, to the mirror/condensing lens control circuit 15e in the LIES analyzing device 15.

Even in a case where no photoelectric sensor 12 is used, with the three-dimensional image camera 14 in continuous operation, the LIES-type object sorting device 10 can operate such that a signal is output to the LABS analyzing device 15 only when the object W is found in a capturing visual field (hereinafter, the case where the photoelectric sensor 12 is used will be referred to as "sequential mode control" and the case where no photoelectric sensor 12 is used will be referred to as "continuous mode control").

Application of the sequential mode control enables the start-capturing standby function of the three-dimensional image camera 14 to be available, so that a measurement program is rendered into simplification. Meanwhile, application of the continuous mode control enables the photoelectric sensor 12 to be omitted and the tracking performance of processing to improve in high-density conveying.

Figure 3:
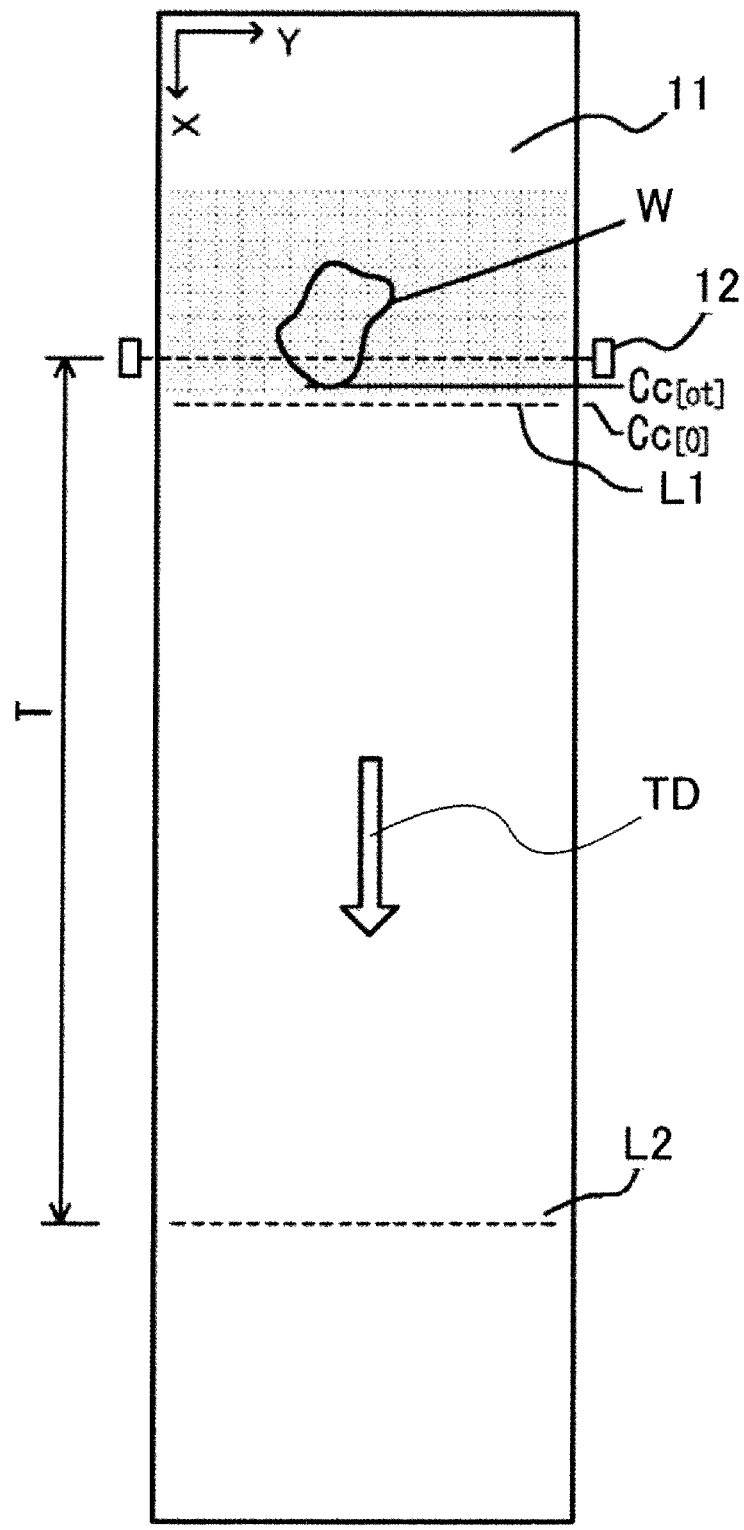
FIG. 3 is a plan view illustrating a coordinate system on a conveyor, applied to sequential mode control.

As illustrated in FIG. 3, in order to grasp the position of the object W on the conveyor 11, the LIES-type object sorting device 10 adopts, in sequential mode, a coordinate system in which the traveling direction and the width direction of the conveyor 11 are defined as X and Y, respectively. Here, the region indicated in gray is the capturing region of the three-dimensional image camera 14. The coordinate value in the Y direction is acquired by the three-dimensional image camera 14, and the coordinate value in the X direction and the length of the object W are acquired from the movement amount of the conveyor 11. The incremental encoder 11b is used in order to acquire the movement amount of the conveyor 11.

Figure 4:
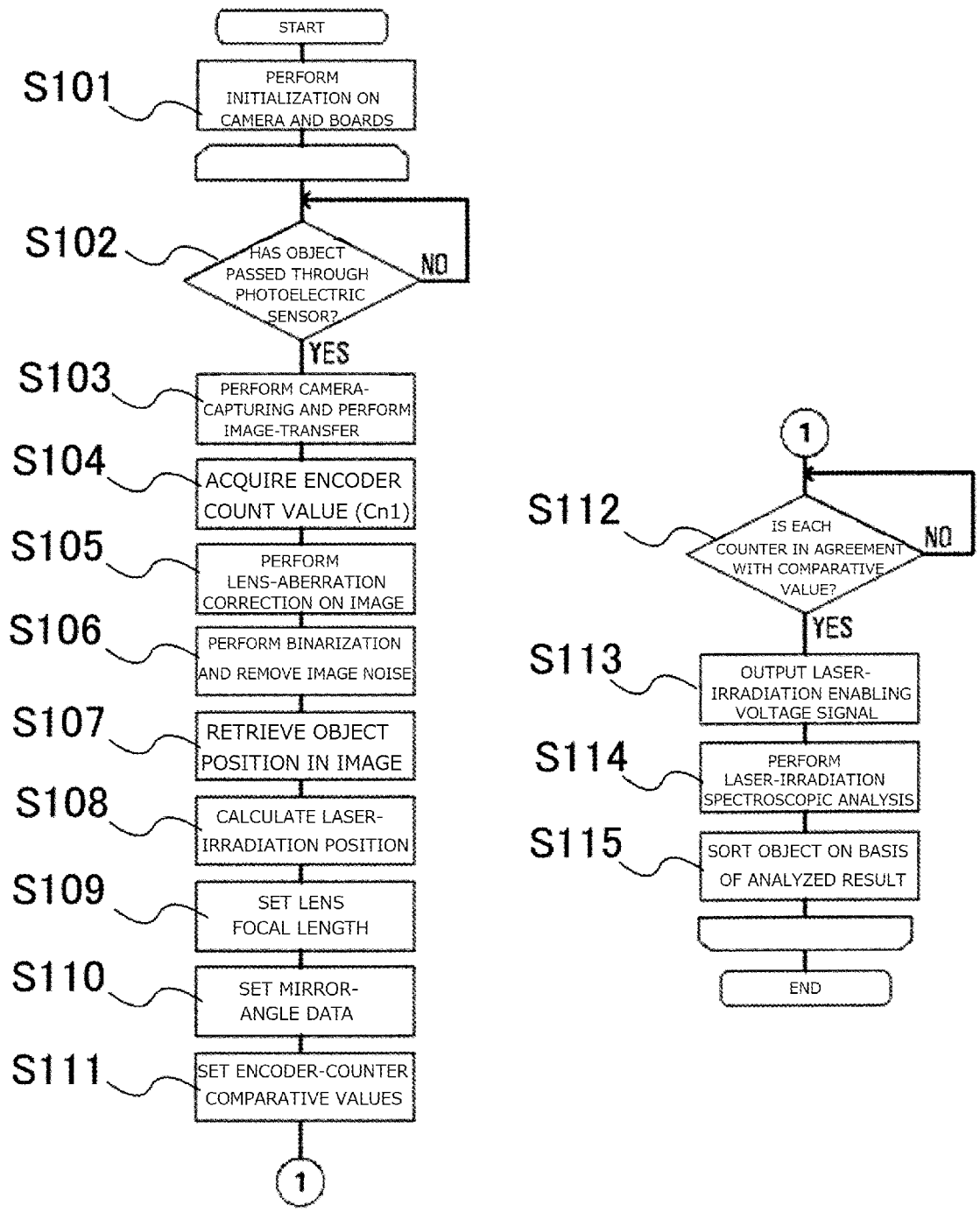
FIG. 4 is a flowchart illustrating a processing operation applied to the sequential mode control.

A processing flow in the sequential mode control) be performed by the control device 17 of the LIBS-type object sorting device 10, will be described below with FIG. 4.

In indication of the sequential mode control, the control device 17 first performs initialization on the data of the three-dimensional image camera 14 and the data of the various boards built in the control device 17 (step S101). After that, the conveyor 11 is driven and it is determined whether an object has passed through the photoelectric sensor unit (step S102). When it is determined at step S102 that the object has passed through the photoelectric sensor unit, the three-dimensional image camera 14 starts capturing and then transfers, after completion of the capturing for one visual field, a three-dimensional image to the camera input board in the control device 17 (step S103). In this case, the control device 17 acquires and stores the count value Cn1 of the counter board immediately after completion of the image transfer (step S104).

Subsequently, with previously acquired three-dimensional image data, the control device 17 corrects distortion (aberration) in height between a lens center portion and the circumference in the image captured at step S103 (step S105). Next, after extracting a 3D blob (voxel aggregate) with removal of the height of the conveyor face (base), the control device 17 reconfigures the 3D blob for a two-dimensional binarized image (step S106). In this case, a pixel at which a voxel is located is replaced with 1, and a pixel at which no voxel is located is replaced with 0. Opening and closing is repeated to the binarized image, so as to remove the intrinsic noise of the image sensing element.

Subsequently, the control device 17 extracts the number of elements in a 2D blob (pixel aggregate) and the position thereof in the image with labeling processing (step S107). When the 2D blob is less than arbitrary area (arbitrary pixel number) input by a user, the 2D blob is eliminated as noise. In a case where no 2D blob remains, the processing restarts from the capturing standby (step S102) in the sequential mode.

Subsequently, the control device 17 calculates the laser-irradiation position in the LIBS analyzing device 15, on the basis of the position of the object extracted at step S107 (step S108). The operation of the calculation in this case will be described below with FIGS. 3 and 5.

Figure 5:
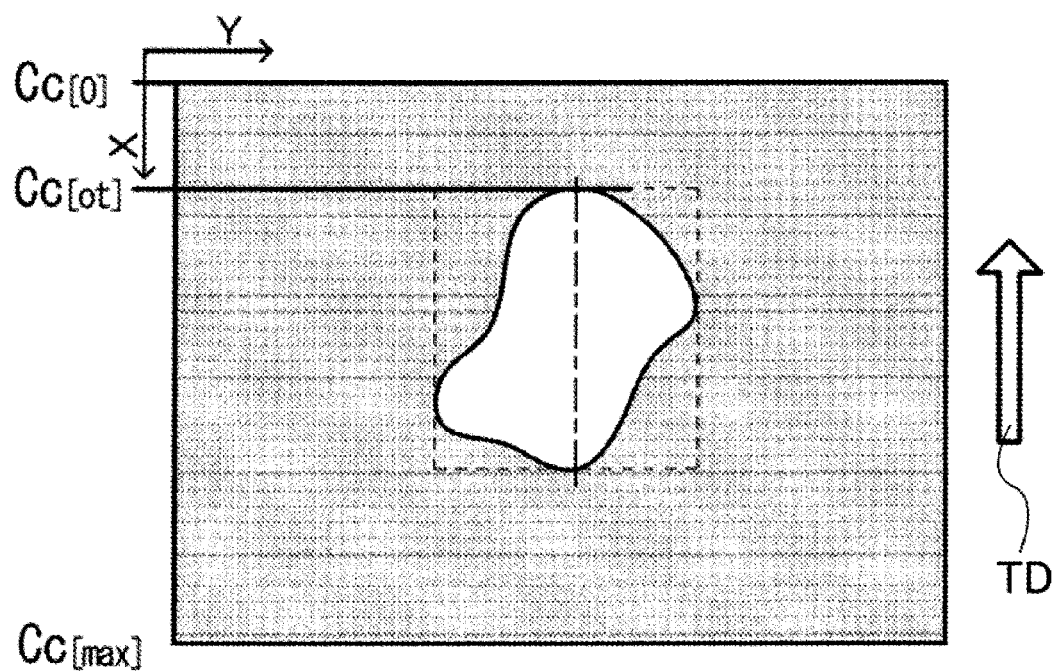
FIG. 5 is a plan view illustrating an exemplary binarized image of a workpiece.

FIG. 5 illustrates an exemplary two-dimensional image acquired at step S106. Here, the arrow in the figure indicates the conveying direction TD of the object. CA 1 represents the count value in the three-dimensional image camera 14 at the instant at which the object crosses the photoelectric sensor. Cc[max] represents the count value in the three-dimensional image camera 14 at the instant at which the three-dimensional image camera 14 finishes capturing over count number (for example, 512 or 256 is set arbitrarily). Cc[ot] represents the count value in the three-dimensional image camera 14 at the instant at which the front portion of the object reaches the projection line. Because the number of pixels in the X direction in the capturing visual field of the three-dimensional image camera 14 (gray region) agrees with the count number (one pixel=one count), the coordinate in the X direction of the top portion (front portion) of the 2D blob remaining in the visual field through the processing is acquired between pixel 0 at the most top portion and pixel max at the most bottom portion in the visual field. Then, when the coordinate is defined as ot, the difference between Cc[max] and ot agrees with Cc[ot].

As illustrated in FIG. 3, with the count numbers Cc[max] and Cc[ot] inside the three-dimensional image camera 14 and count number T corresponding to the distance from the photoelectric sensor to the laser-irradiation position L2 in the LIBS analyzing device 15, the count value Cs of the counter board corresponding to the laser-irradiation position L2 is calculated by the following Formula (1).

$$Cs = Cn_1 - (Cc_{[max]} - Cc_{[ot]}) + T \quad \text{Formula (1)}$$

Here, Cn1 represents the count value of the counter board immediately after the three-dimensional image camera 14 finishes the capturing.

Subsequently, the count value Cs is further corrected by the following Formula (2), and the count value Ts of the counter board corresponding to a laser-irradiation start position is determined.

$$Ts = Cs + Or + Ost + Obs \quad \text{Formula(2)}$$

Here, Or represents count number corresponding to statically determinate time in rotation of the mirror in the LIBS analyzing device 15, Ost represents count number corresponding to the distance from the front of the object to a laser-irradiation allowing position, and Obs represents count number (arbitrarily set) corresponding to a free running distance until a laser-irradiation start.

Then, with the calculated count value Ts, the count value Te of the counter board corresponding to a laser-irradiation end position in the LIBS analyzing device 15, is determined by the following Formula (3).

$$Te = Ts + Om \quad \text{Formula (3)}$$

Here, Om represents count number (arbitrarily set) corresponding to a laser-irradiation distance.

Furthermore, the count value Ce of the counter board corresponding to the measurement-end position of one object, is determined by the following Formula (4).

$$Ce = Te + Oe \quad \text{Formula (4)}$$

Here, Oe represents count number corresponding to processing time inside the LIES analyzing device 15.

Referring back to the operation of the flowchart illustrated in FIG. 4, subsequently, the control device 17 extracts height data of the object located between belt positions corresponding to the count value Ts of the laser-irradiation start position and the count value Te of the laser-irradiation stop position calculated at step S108, and then determines lens focal length in the LIES analyzing device 15 corresponding to the height of the object (step S109). In this case, such that the LIBS-analysis laser is irradiated along a center line of the rectangle circumscribing the 2D blob image (refer to the dot-and-dash line of FIG. 5), the height data Z in a range of is <X<Te on the center line is extracted and then is converted into an analog voltage value proportional thereto.

Subsequently, the control device 17 extracts position data Y of the center line of the rectangle circumscribing the 2D blob image of the object, sets angle data of the mirror included in the optical system of the LIES analyzing device 15, and converts the angle data of the mirror into an analog voltage value proportional thereto (step S110). After that, the count value Ts of the laser-irradiation start position and the count value Te of the laser-irradiation stop position calculated at step S108 are stored as comparative values into the counter board. The count value Ts is stored as a comparative value into the D/A converter board (step S111).

After the three-dimensional image camera 14 measures the three-dimensional image, the object is conveyed on the conveyor 11 to the LIB S-analysis laser-irradiation position. Then, the count values of the counter Cn1 and Cn2 in the counter board and the counter Cn3 in the D/A converter board, gradually increase. On the basis of the increases, the control device 17 determines whether the counters Cn1, Cn2, and Cn3 are in agreement with the respective comparative values (step S112).

The control device 17 outputs a signal of starting laser irradiation at the instant at which Cn1 agrees with Ts and outputs a digital voltage signal of stopping the laser irradiation at the instant at which Cn2 agrees with Th (step S113). The control device 17 starts to output Z analog voltage of adjusting the lens focal length and Y analog voltage of adjusting the mirror angle at the instant at which Cn3 agrees with Ts.

Subsequently, in accordance with the three types of voltage signals sent from the control device 17, the LIBS analyzing device 15 adjusts the focal position of the laser light, acquires spectral data, and transmits the spectral data to the control device 17. The control device 17 that has received the spectral data, performs spectroscopic analysis on the spectral data (step S114). After that, on the basis of a result of the analysis at step S114, the control device 17 outputs a driving signal to the paddle. The paddle moves upward and downward to change the drop position of the object, so that the object is sorted (step S115).

Next, as a modification of the LABS-type object sorting device 10, the continuous mode control to be performed by the control device 17 will be described with FIGS. 6 and 7.

Figure 6:
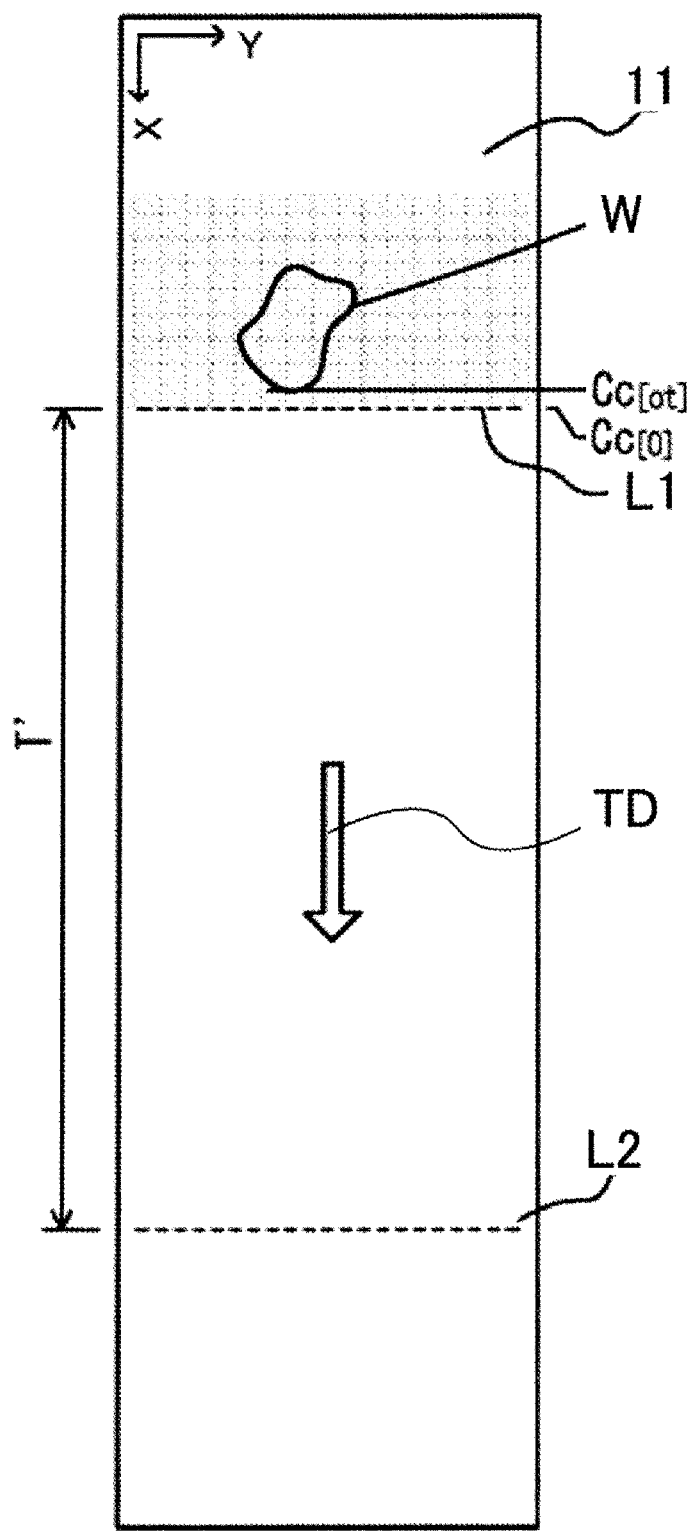
FIG. 6 is a plan view illustrating a coordinate system on the conveyor, applied to continuous mode control.
Figure 7:
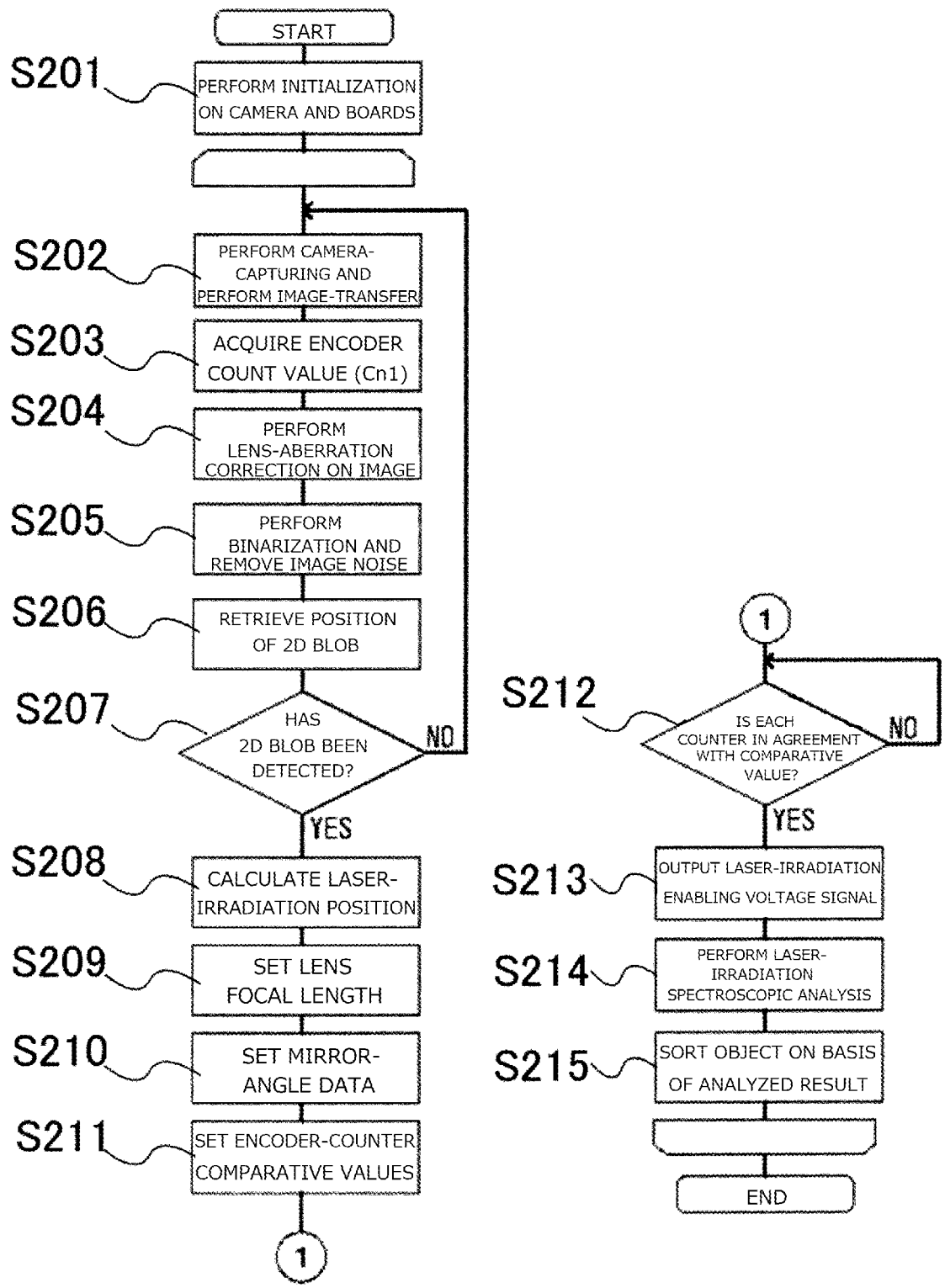
FIG. 7 is a flowchart illustrating a processing operation applied to the continuous mode control.

The LIBS-type object sorting device 10 adopts the coordinate system of FIG. 6 in continuous mode. Here, similarly to the case of the sequential mode of FIG. 3, the region indicated in gray is the capturing region of the three-dimensional image camera 14. The coordinate value in the Y direction is acquired by the three-dimensional image camera 14, and the coordinate value in the X direction and the length of the object W are acquired from the movement amount of the conveyor 11. The incremental encoder 11b is used in order to acquire the movement amount of the conveyor 11.

A processing flow in the sequential mode control to be performed by the control device 17 of the LABS-type object sorting device 10, will be described below with FIG. 7.

Similarly to the case of the sequential mode control, the control device 17 first performs initialization on the data of the three-dimensional image camera 14 and the data of the various boards built in the control device 17 (step S201). After that, the three-dimensional image camera 14 starts capturing and then transfers, after completion of the capturing for one visual field, a three-dimensional image to the camera input board in the control device 17 (step S202). In this case, the control device 17 acquires and stores the count value Cn1 of the counter board immediately after completion of the image transfer (step S203).

Subsequently, with previously acquired three-dimensional image data, the control device 17 corrects distortion (aberration) in height between a lens center portion and the circumference in the image captured at step S202 (step S204). Next, after extracting a 3D blob (voxel aggregate) with removal of the height of the conveyor face (base), the control device 17 reconfigures the 3D blob for a two-dimensional binarized image (step S205). In this case, a pixel at which a voxel is located is replaced with 1, and a pixel at which no voxel is located is replaced with 0. Opening and closing is repeated to the binarized image an arbitrary number of times, so as to remove the intrinsic noise of the image sensing element.

Subsequently, the control device 17 extracts the number of elements in a 2D blob (pixel aggregate) and the position thereof in the image with labeling processing (step S206). Next, the control device 17 compares the number of elements in the 2D blob extracted at step S206 with pixel number indicating arbitrary area, input by a user (step S207). In a case where it is determined that the number of elements in the 2D blob that has been extracted is less than the set pixel number, the extracted 2D blob is eliminated as noise. The processing goes back to step S202, and the three-dimensional image camera 14 restarts capturing.

Subsequently, the control device 17 calculates the laser-irradiation position in the LIBS analyzing device 15, on the basis of the position of the object extracted at step S206 (step S208). The operation of the calculation in this case is basically similar to that described in FIG. 5 in the sequential mode control.

In the continuous mode control, as illustrated in FIG. 6, with the count numbers Cc max and Cc[ot] inside the three-dimensional image camera 14 and count number T'' corresponding to the distance from the photoelectric sensor to the laser-irradiation position L2 in the LIBS analyzing device 15, the count value Cs of the counter board corresponding to the laser-irradiation position L2 is calculated by the following Formula (1)'.

$$Cs = Cn_1 - (Cc_{[max]} - Cc_{[ot]}) + T^1 \quad (1)'$$

Here, values similar to those in the sequential mode are used for Cn1, Cc[max], and Cc[ot]. In FIG. 6, T' represents count number corresponding to the distance from the position L1 at which the three-dimensional image camera 14 starts the capturing to the laser-irradiation position L2 in the LIBS analyzing device 15.

Subsequently, similarly to the case of the sequential mode control, the count value Ts of the counter board corresponding to the laser-irradiation start position, is determined by Formula (2) with the count value Cs, and the count value Te of the counter board corresponding to the laser-irradiation end position in the LIBS analyzing device 15, is determined by Formula (3) with the calculated count value Ts. Furthermore, the count value Ce of the counter board corresponding to the measurement-end position of one object, is determined by Formula (4).

Referring back to the operation of the flowchart illustrated in FIG. 7, subsequently, the control device 17 extracts height data of the object located between belt positions corresponding to the count value Ts of the laser-irradiation start position and the count value Te of the laser-irradiation stop position calculated at step S208, and then determines the lens focal length in the LIBS analyzing device 15 corresponding to the height of the object (step S209).

Subsequently, similarly to the case of the sequential mode control, the control device 17 sets angle data of the mirror included in the optical system of the LIBS analyzing device 15, and converts the angle data of the mirror into an analog voltage value proportional thereto (step S210). The control device 17 stores the count value Ts of the laser-irradiation start position and the count value Te of the laser-irradiation stop position calculated at step S208 as comparative values into the counter board, and additionally stores the count value Ts as a comparative value into the D/A converter hoard (step S211).

After the three-dimensional image camera 14 measures the three-dimensional image, the object is conveyed on the conveyor 11 to the LIBS-analysis laser-irradiation position. Then, the count values of the counter Cn1 and Cn2 in the counter board and the counter Cn3 in the D/A converter board, gradually increase. On the basis of the increases, the control device 17 determines whether the counters Cn1, Cn2, and Cn3 are in agreement with the respective comparative values (step S212).

Subsequently, the control device 17 outputs a signal of starting laser irradiation at the instant at which Cn1 agrees with Ts. and outputs a digital voltage signal of stopping the laser irradiation at the instant at which Cn2 agrees with Te (step S213). The control device 17 starts to output Z analog voltage of adjusting the lens focal length and Y analog voltage of adjusting the mirror angle at the instant at which Cn3 agrees with Ts.

Similarly to the case of the sequential mode control, in accordance with the three types of voltage signals sent from the control device 17, the LIBS analyzing device 15 adjusts the focal position of the laser light, acquires spectral data, and transmits the spectral data to the control device 17. The control device 17 that has received the spectral data, performs spectroscopic analysis on the spectral data (step S214). After that, on the basis of a result of the analysis at step S214, the control device 17 outputs a driving signal to the paddle. The paddle moves upward and downward to change the drop position of the object, so that the object is sorted (step S215).

As described above, according to the LABS-type object sorting device 10, the three-dimensional image camera 14 captures an image of an object conveyed on the conveyor 11, and the focal length of the laser to be irradiated from the LIBS analyzing device 15 disposed downstream of the three-dimensional image camera 14 is adjusted on the basis of image data of the object. Thus, even in the case of the use of the LIBS analyzing device 15 having a scheme, of repeatedly irradiating relatively weak laser light at high frequency, the object moving at high speed on the conveyor 11 can be sorted with high accuracy (high S/ratio) in the entire region in the belt-width direction.

Embodiment

A more specific embodiment of the sorting operation with the IBS-type object sorting device 10, will be described with FIGS. 8 to 13.

In the present embodiment, for handling a case where a plurality of 2D blobs is detected in the visual field, a First in First Out (FIFO) array variable is used to store a plurality of set values temporarily. The count values Ts and Te corresponding to the laser-irradiation start position and the laser-irradiation end position in the LABS analyzing device 15 and sequences for controlling the mirror angle and the lens focal length, are input into the FIFO array variable. For the mirror angle, a sequence into which the time-series locus of the laser-irradiation position Y to an object in the capturing visual field is converted in the D/A-converter output-voltage range of the D/A converter hoard, is input into FIFO array variable. For the lens focal length, a sequence into which the height data Z of the object in a range of Ts<X<Te on a center line of the rectangle circumscribing the 2D blob is converted in the D/A-converter output-voltage range of the D/A converter board, is input into the FIFO array variable.

Figure 8:
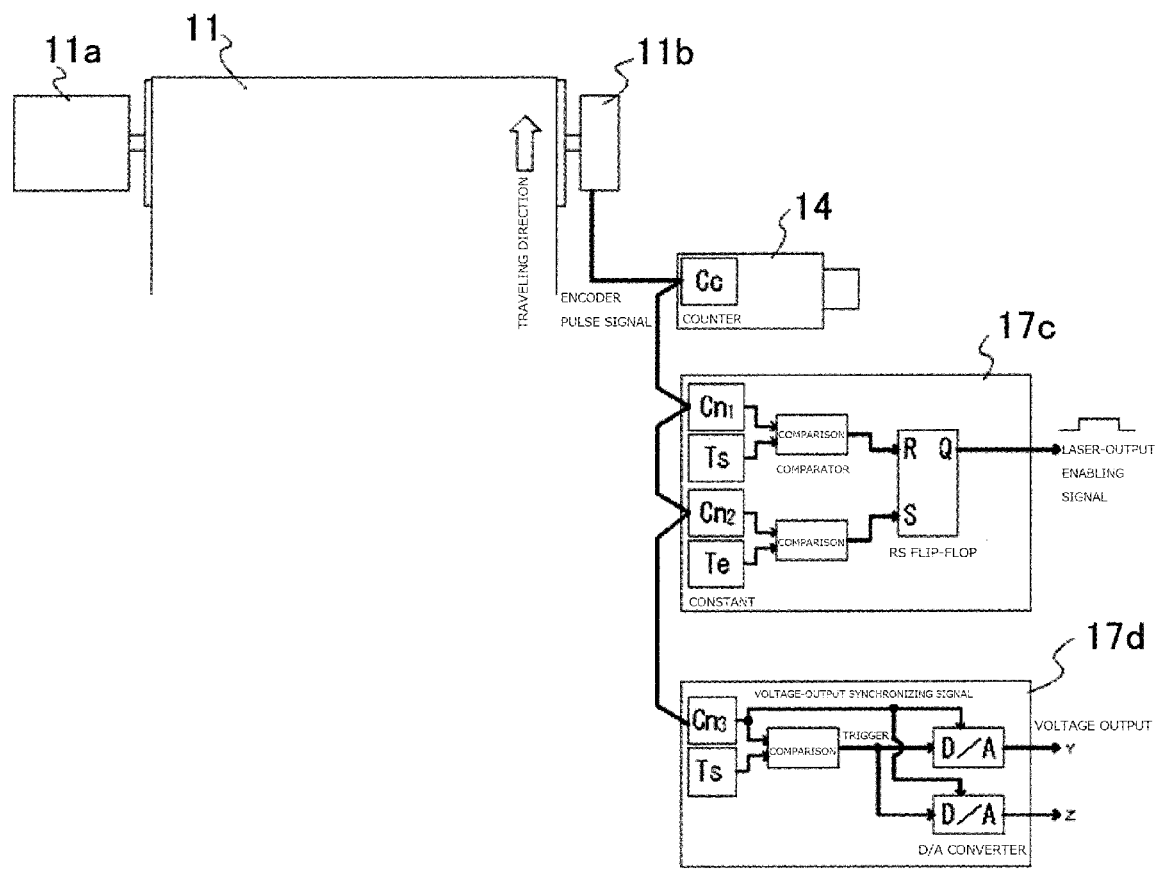
FIG. 8 is an enlarged view illustrating a main part indicating a determination process of signal output in the LIBS-type object sorting device illustrated in FIG. 1.

FIG. 8 illustrates a determination process of signal output in the device according to the present embodiment. In a case where both of the counter board 17c and the D/A converter board 17d are in output completion, the data from the FIFO array variable is read. Then. Ts and Te are input into comparators of the counter board 17c, Ts is input into a comparator of the D/A converter board 17d, and the sequences corresponding to the mirror angle and the lens focal length, are input into D/A converters.

Meanwhile, in a case where both of the counter board 17c and the INA converter hoard 17d are in output incompletion, the process is on standby until the completion. In the counter board 17c in this case, the comparator compares Cn1 and Ts, and an R-S flip-flop circuit is rendered into a set when Cn1 and is are in agreement. The comparator compares Cn2 and Te, and the R-S flip-flop circuit is rendered into a reset when Cn2 and Te are in agreement. The R-S flip-flop circuit outputs a laser-output enabling signal corresponding to between Ts and IC. Similarly, the comparator compares Cn3 and Ts in the D/A converter board 17d. When Cn3 and Ts are in agreement, the D/A converters output voltage signals for controlling the mirror angle and the lens focal length, in synchronization with a pulse signal output from the incremental encoder 11b. After completion of the output of the voltage signals, writing time of a timeout detection variable to be described later is deleted.

When a large number of objects are processed at a time in the LIBS-type object sorting device 10, there is a possibility that the D/A converters do not output the voltage signals properly due to the limit of the throughput of a program. Thus, a timeout detection function can be added to the LIBS-type object sorting device 10. Specifically, set values are written in the FIFO array variable and simultaneously current time is saved as writing time into the timeout detection variable. Timeout occurs in a case where the difference in comparison between the current time and the writing time every second immediately after the save of the writing time into the timeout detection variable, exceeds an arbitrary number of seconds. When the timeout occurs, the current FIFO array variable and the writing time of the timeout detection variable are deleted, and the counter board and the D/A converter board are initialized.

Figure 9:
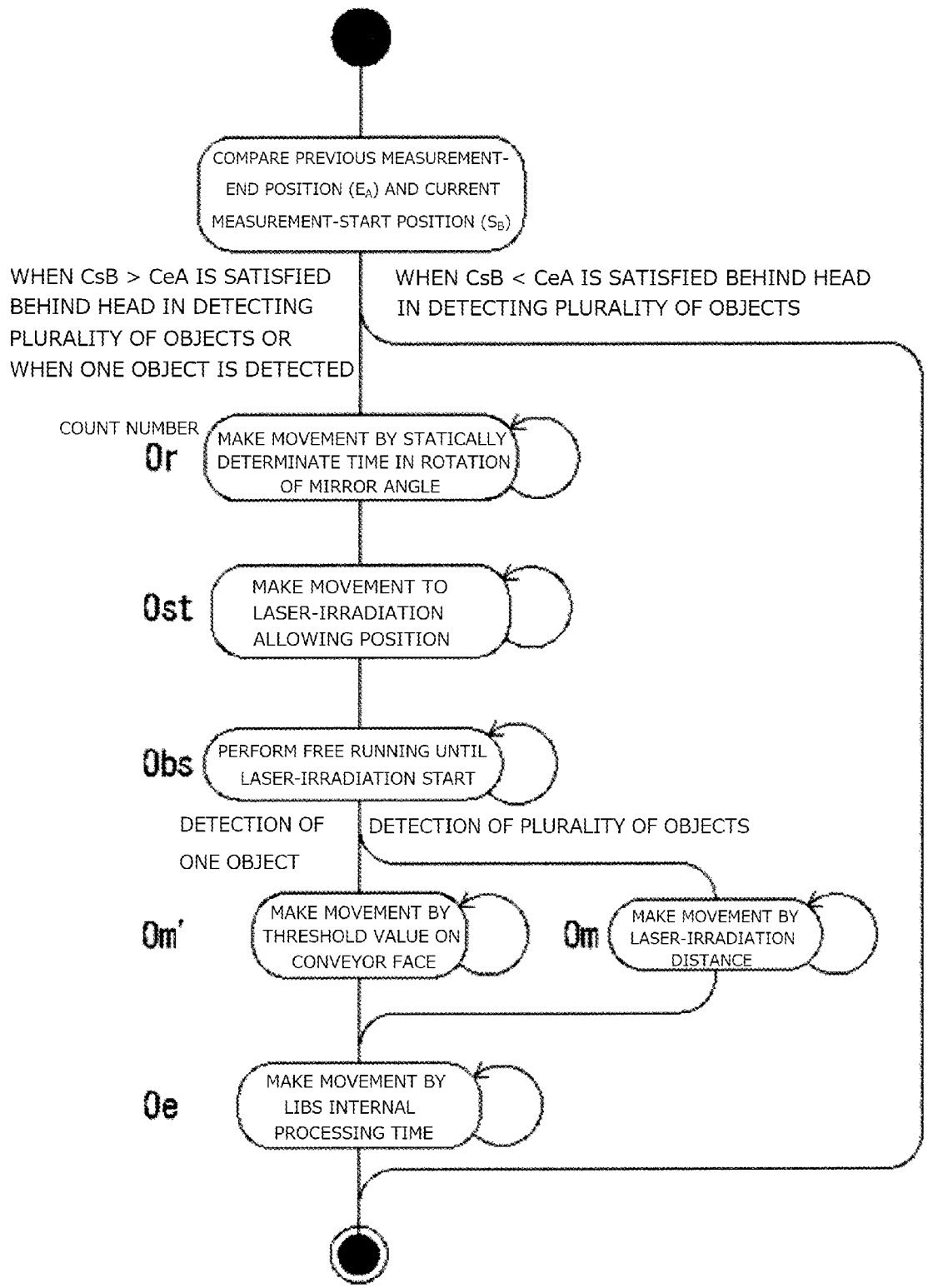
FIG. 9 is a state chart for generating a laser-irradiation locus of an LIBS analyzing device on a time-series basis.
Figure 10:
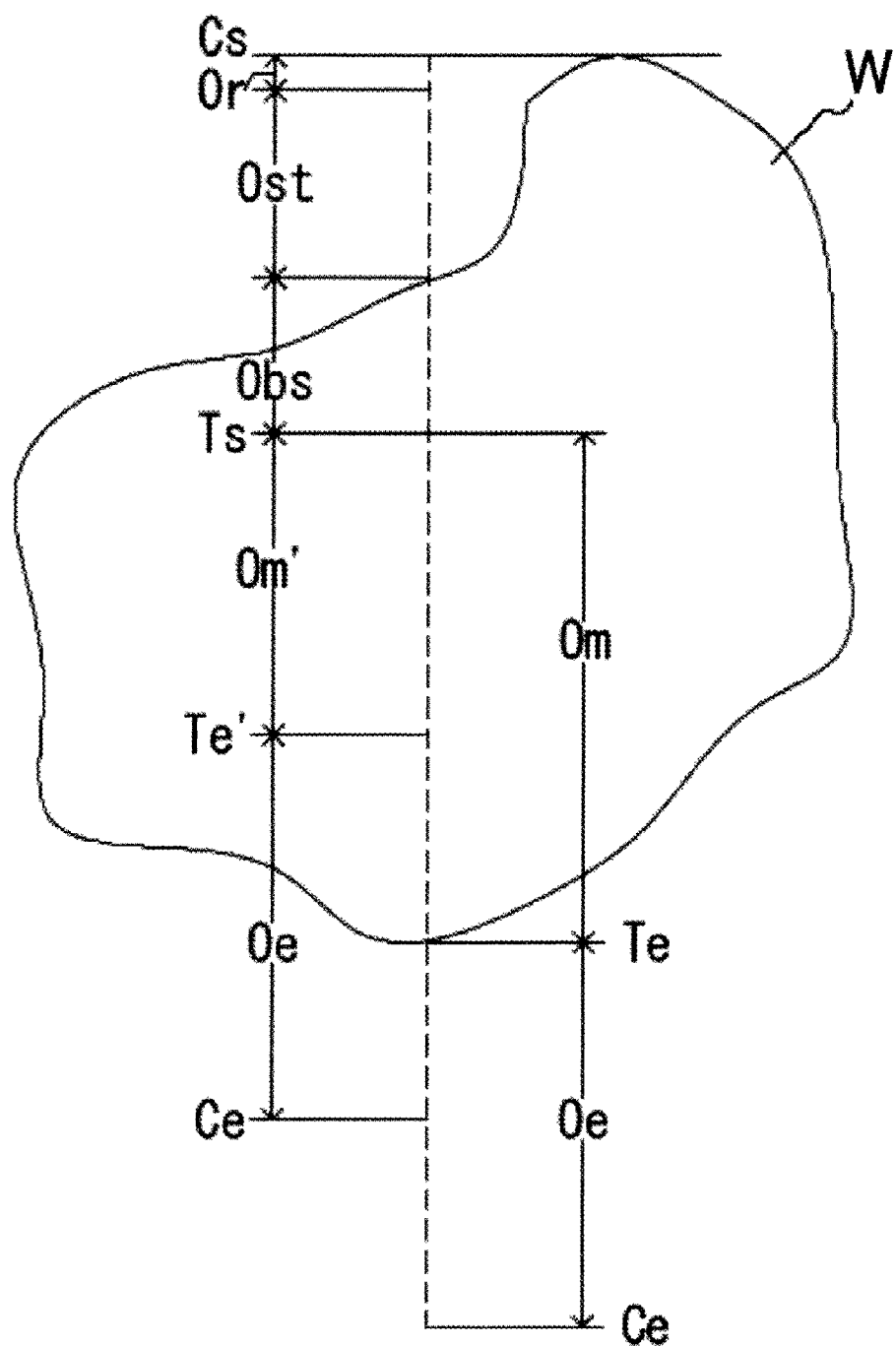
FIG. 10 is a plan view illustrating a specific example on a 2D blob of one object detected by three-dimensional measurement.

FIG. 9 illustrates a state flowchart for generating a laser-irradiation locus of the LIBS analyzing device 15 on a time-series basis. Here, the variables Or, Ost, Obs, Om, and Oe illustrated in the figure represent count numbers (movement distances) corresponding to respective terms in Formulas (2) to (4). FIG. 10 illustrates a specific example of the variables defined on the 2D blob of one object detected by three-dimensional measurement. Note that a dotted line in the figure indicates a center line of the rectangle circumscribing the 2D blob image.

Figure 11:
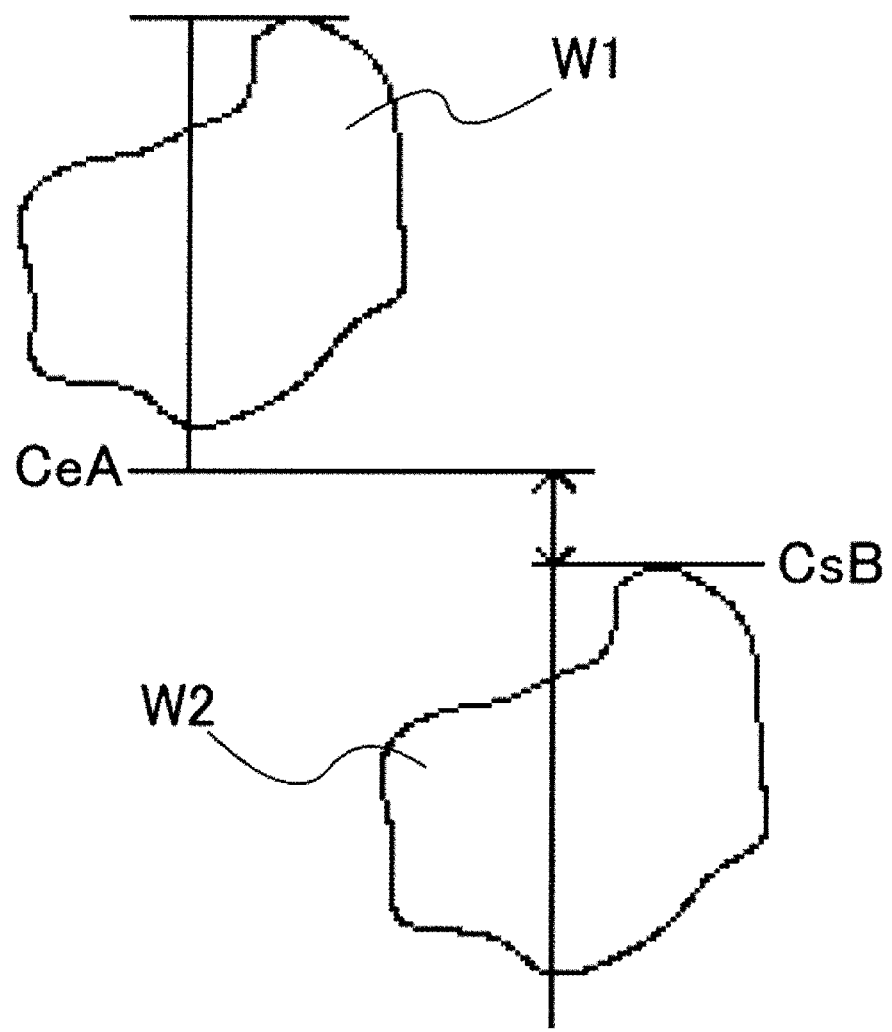
FIG. 11 is a plane view illustrating a first specific example in a case where the 2D blobs of a plurality of objects are detected in a visual field.
Figure 12:
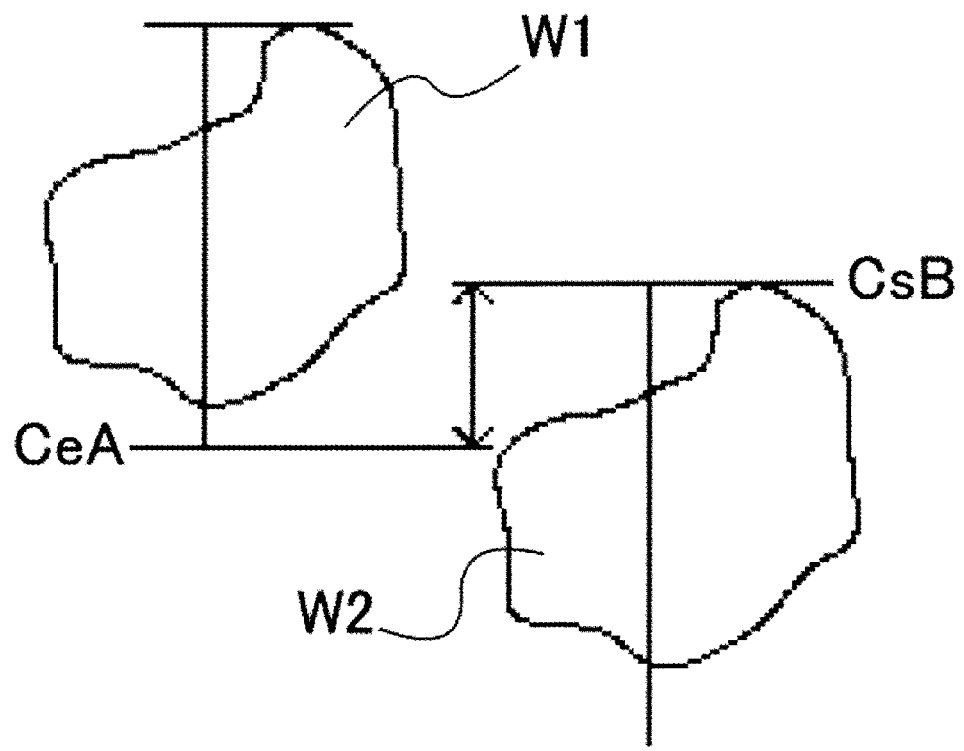
FIG. 12 is a plane view illustrating a second specific example in the case where the 2D blobs of a plurality of objects are detected in a visual field.

Here, the method of setting the length of Om varies between one 2D blob and at least two 2D blobs in number in the visual field. In a case where the number of 2D blobs is one in the visual field, Om and Te for laser irradiation up to the rear-portion edge of the object, are automatically selected. Meanwhile, in a case where the number of 2d blobs is at least two in the visual field, Om' and Te' are set for an arbitrary position in an object. FIGS. 11 and 12 illustrate a determination criterion for a laser-irradiation start behind the head in a case where the 2D blobs of a plurality of objects are detected, in that manner.

Note that the determination is not performed in a case where the 2D blob in the visual field includes one object. In a case where the relationship between the measurement-end point CeA of the leading object W1 and the measurement-start point CsB of the second object W2, satisfies CsB>CeA (CsB is located behind CeA), as illustrated in FIG. 11, CsB is measured after measurement of CeA is finished. Meanwhile, in a case where the following formula is satisfied: CsB<CeA (CsB is located ahead of CeA), as illustrated in FIG. 12, CsB is not measured after measurement of CeA is finished.

As illustrated in the state flowchart of FIG. 9, in a case where LIBS measurement is performed after determination of a laser-irradiation start is performed first, movement is made by the statically determinate time (Or) in rotation of the mirror angle. Because there is a possibility that hunting occurs due to the moment of inertia of the mirror after the mirror rotates, the statically determinate time for several pixels is provided. In a case where the height of a pixel at the position is a predetermined threshold value or less, movement is continuously made up to a front edge having a height of the threshold value or more (Ost).

Subsequently, movement is made by the arbitrary count number (Obs) from the front edge of the object and laser irradiation is started, so that irregular reflection influence of the laser light can be reduced from the edge of the object. In this case, when one object is recognized in the visual field, movement is made from the laser-irradiation start position to the rear edge of the object (Om), or when a plurality of objects is recognized, movement is made by the arbitrary distance (Om') from the laser-irradiation start position. Movement for the LIBS internal processing time (Oe) corresponds to preparation time for measurement of the next object after one object is measured with the LIBS and the measurement program.

Figure 13:
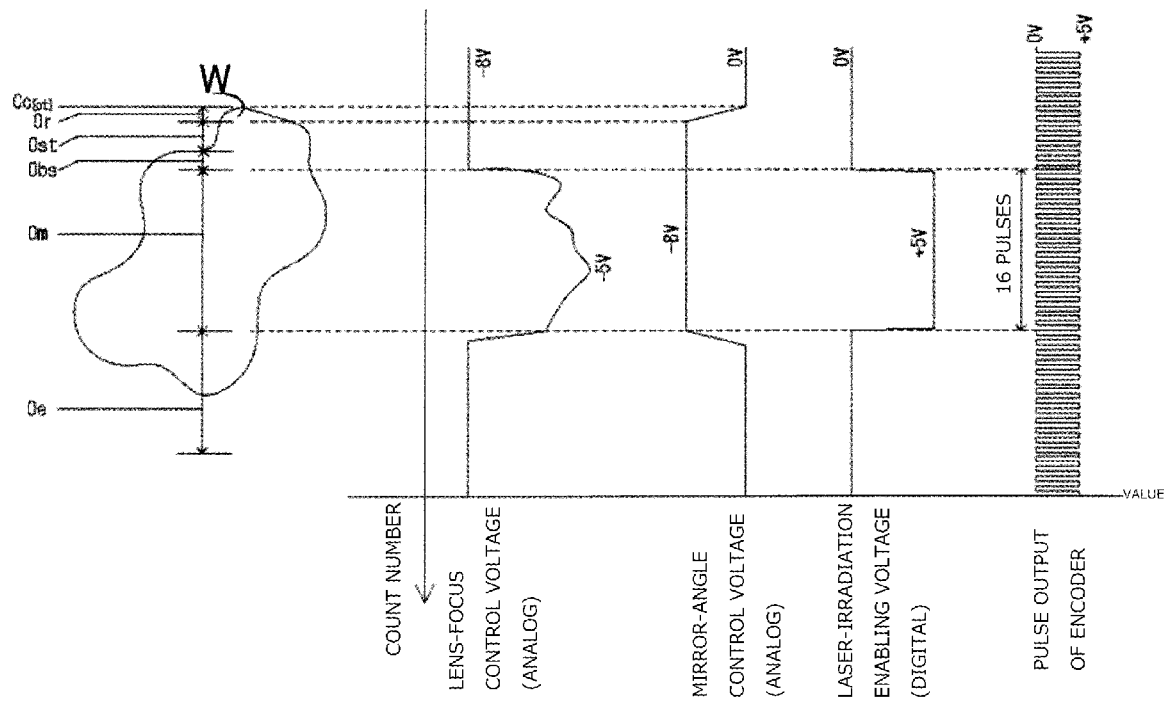
FIG. 13 illustrates a laser-irradiation position to one object and a specific exemplary chart of each signal output.

FIG. 13 illustrates the laser-irradiation position to one object and an exemplary chart of each signal output. FIG. 13 illustrates the relationship between the laser-irradiation position on the 2D blob, the analog signals output by the D/A converter hoard (lens-focus control voltage and mirror-angle control voltage), the digital signal output by the counter board (laser enabling voltage), and the pulse output of the encoder.

In FIG. 13, the count number indicates the time from Cc[ot] to Oe (movement distance). In the specific example, control is performed with: the lens-focus control voltage having −8 V corresponding to the height of the conveyor face and −5 V corresponding to the maximum height of the object; the mirror-angle control voltage having 0 V corresponding to the center of the visual field, −8 V corresponding to the left end of the visual field, and +8 V corresponding to the right end of the visual field; and the laser-irradiation enabling voltage having 0 V corresponding to irradiation prohibition and +5 V corresponding to irradiation. Because one pulse is output in the pulse output of the encoder when the belt of the conveyor 11 travels by 0.5 mm, the laser-irradiation distance corresponds to 16 pulses, namely, 8.0 mm. Meanwhile, the lens-focus control voltage is output in conjunction with the laser-irradiation enabling voltage. An output start of the mirror-angle control voltage is made at the detection point Cc[ot], and then the output becomes 0 V when the laser-irradiation enabling voltage becomes 0V.

The LIBS analyzing device 15 receives the laser-output enabling signal and the voltage signals of controlling the mirror angle and the lens focal length, as illustrated in FIG. 13. Then, the LIBS analyzing device 15 irradiates the object that has reached the laser-irradiation position, with the laser linearly, detects a spectrum, and measures an elemental component. The LIBS analyzing device 15 irradiates the analysis laser in synchronization with the pulse signal output by the incremental encoder 11b.

The embodiments of the LIBS-type object sorting vice according to the present invention and the modification based thereon, have been described above, but the present invention is not necessarily limited to these. Thus, a person skilled in the art may conceive various alternative embodiments or alterations without departing from the spirit of the present invention or the scope of the claims.

REFERENCE SIGNS LIST

10 LIBS-type object sorting device
11 conveyor
11a conveyor motor
11b incremental encoder
12 photoelectric sensor
13 laser projector
14 three-dimensional image camera
15 LIBS analyzing device
16 paddle
17 control device
17c counter board
17d D/A converter board
17e camera input board

The invention claimed is:

1. A laser induced breakdown spectroscopy (LIBS) object sorting device configured to perform LIBS analysis on an object to be sorted while conveying the object to be sorted with a conveyor, the LIBS object sorting device being configured to sort the object to be sorted, the LIBS object sorting device comprising, with a traveling direction, a width direction, and a height direction of the conveyor defined as X, Y, and Z, respectively:

a three-dimensional-shape measurement means configured to repeatedly measure a cross-sectional shape of the object to be sorted at a cross-section-measurement YZ vertical face every predetermined time, the three-dimensional-shape measurement means being configured to acquire a space-coordinate group of a top face of the object to be sorted in top view on the conveyor with a reference origin on the object to be sorted as a reference;

an LIBS analyzing means including a width-direction movement means configured to move a beam position of laser light in a Y direction in a laser-movement YZ vertical face and a height-direction movement means configured to move a beam-focus position of the laser light in a Z direction in the laser-movement YZ vertical face, the LIBS analyzing means being configured to perform chemical composition analysis on the object to be sorted while irradiating the object to be sorted with the laser light;

a conveying-path switching means configured to switch a conveying path in the Z direction of the object to be sorted subjected to the chemical composition analysis, the three-dimensional-shape measurement means, the LIBS analyzing means, and the conveying-path switching means being provided in this order in the X direction;

a computing means configured to acquire the space-coordinate group of the top face on an analysis XZ vertical face including an analyzing point selected from the space coordinates, the computing means being configured to determine an analyzing section on which the LIBS analysis is to be performed; and a control means configured to cause the width-direction movement means to move the beam position to the analysis XZ vertical face, the control means being configured to cause, when detecting that the analyzing section has reached the analysis XZ vertical face from a movement amount of the conveyor, based on the movement amount, the height-direction movement means to move the beam-focus position to the space coordinates along the analyzing section while causing the object to be sorted to be irradiated with the laser light, wherein the space-coordinate group corresponds to a pixel of an image of the top face in top view on the conveyor, the conveyor has an incremental encoder that outputs a pulse signal in response to a rotational amount of a driving motor, and the control means causes the laser light to be irradiated along the analyzing section, with a counter number corresponding to the pulse signal, associated with the pixel of the image, wherein the LIBS analyzing means is configured to irradiate the laser light at the object starting at a laser-irradiation start position (Ts) of the object located at a distance of an arbitrary count number (Obs) from a front edge of the object.

2. The LIBS object sorting device according to claim 1, wherein the three-dimensional-shape measurement means acquires the space-coordinate group after detecting passage of the object to be sorted through the cross-section-measurement YZ vertical face, and additionally acquires a reference movement amount of the conveyor until the reference origin reaches the laser-movement YZ vertical face, and the control means causes the beam position and the beam-focus position to move, based on the reference movement amount.

3. The LIBS object sorting device according to claim 2, wherein the reference origin is a position at which the object to be sorted first reaches the cross-section-measurement YZ vertical face.

4. The LIBS object sorting device according to claim 1, wherein the three-dimensional-shape measurement means includes a three-dimensional image camera having a laser projector that projects a cross-sectional-shape line of the object to be sorted at the cross-section-measurement YZ vertical face.

5. The LIBS object sorting device according to claim 4, wherein the width-direction movement means and the height-direction movement means control a mirror angle and a lens focal length in an optical system of the laser light.

6. The LIBS object sorting device according to claim 3, wherein a plurality of the objects to be sorted has respective parts disposed alongside in the Y direction, and the computing means determines the respective analyzing sections of the objects to be sorted such that the analyzing sections are not disposed alongside in the Y direction.

7. The LIBS object sorting device according to claim 6, further comprising:

a conveyance detecting means located upstream of the three-dimensional-shape measurement means in the X direction, the conveyance detecting means being configured to detect conveyance of the objects to be sorted, the conveyance detecting means being configured to start an operation of the three-dimensional-shape measurement means.

8. The LIBS object sorting device according to claim 7, wherein the conveyance detecting means includes a photoelectric sensor.

9. The LIBS object sorting device according to claim 2, wherein the three-dimensional-shape measurement means includes a three-dimensional image camera having a laser projector that projects a cross-sectional-shape line of the object to be sorted at the cross-section-measurement YZ vertical face.

10. The LIBS object sorting device according to claim 3, wherein the three-dimensional-shape measurement means includes a three-dimensional image camera having a laser projector that projects a cross-sectional-shape line of the object to be sorted at the cross-section-measurement YZ vertical face.

* * * * *